Oct. 30, 1923.
W. H. YOUNG
SCREW CUTTING MACHINE
Filed April 1, 1920     3 Sheets-Sheet 1
1,472,622
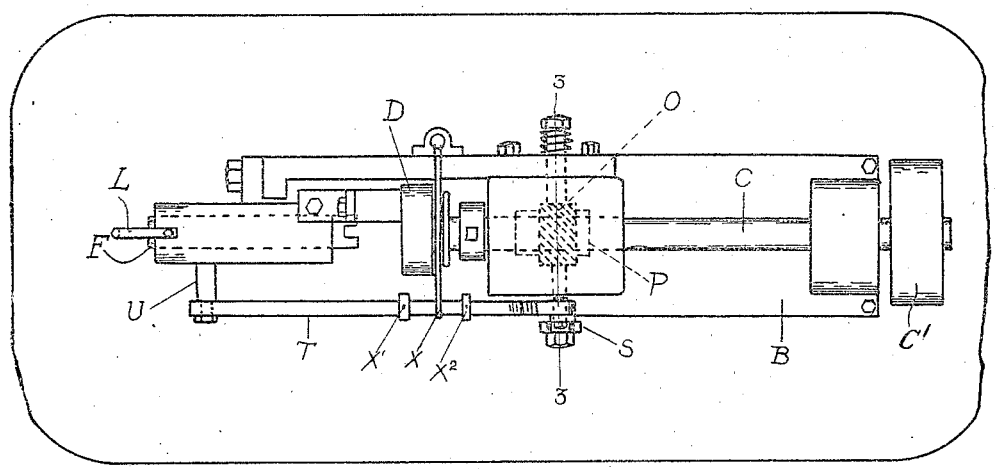
Fig. 2.
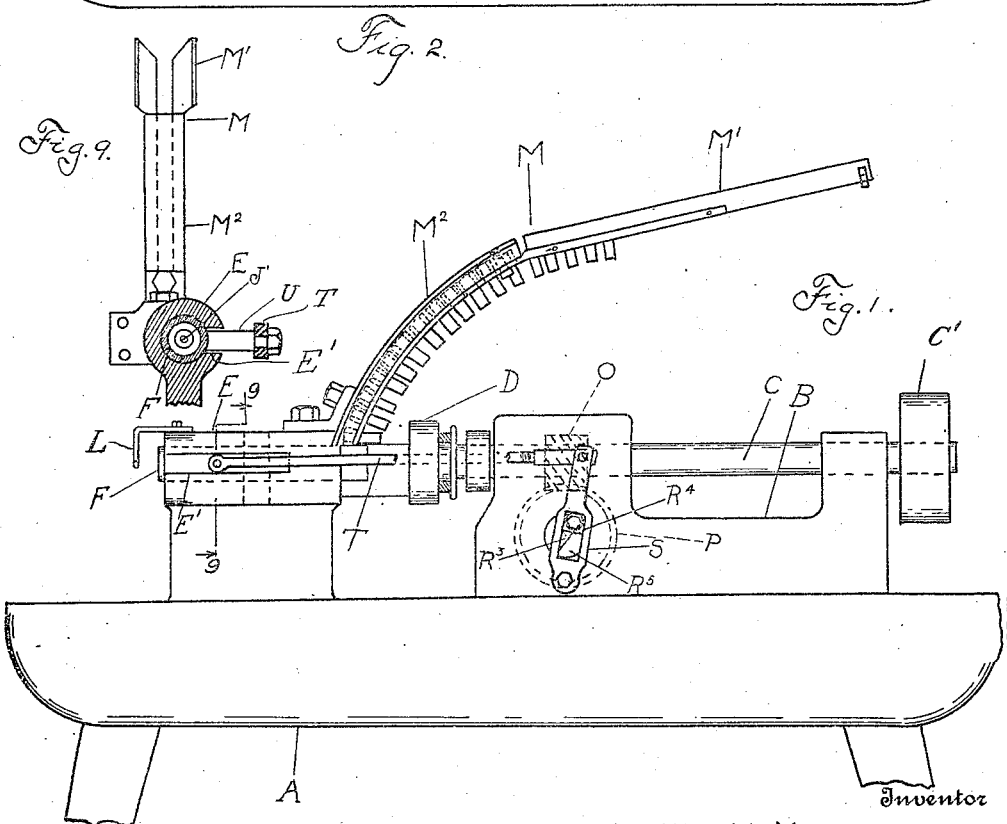
Inventor
Walter H. Young
By Whittemore Hulbert & Whittemore
Attorneys

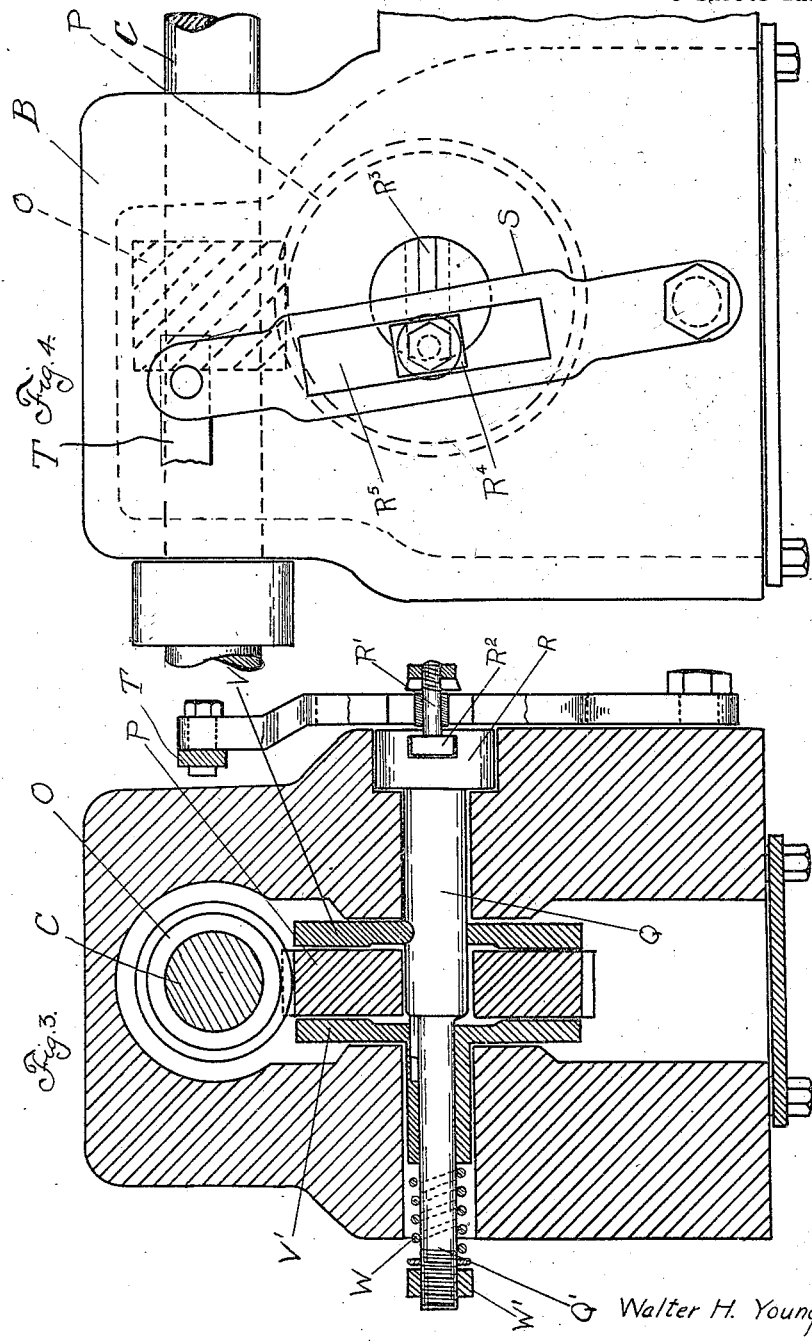

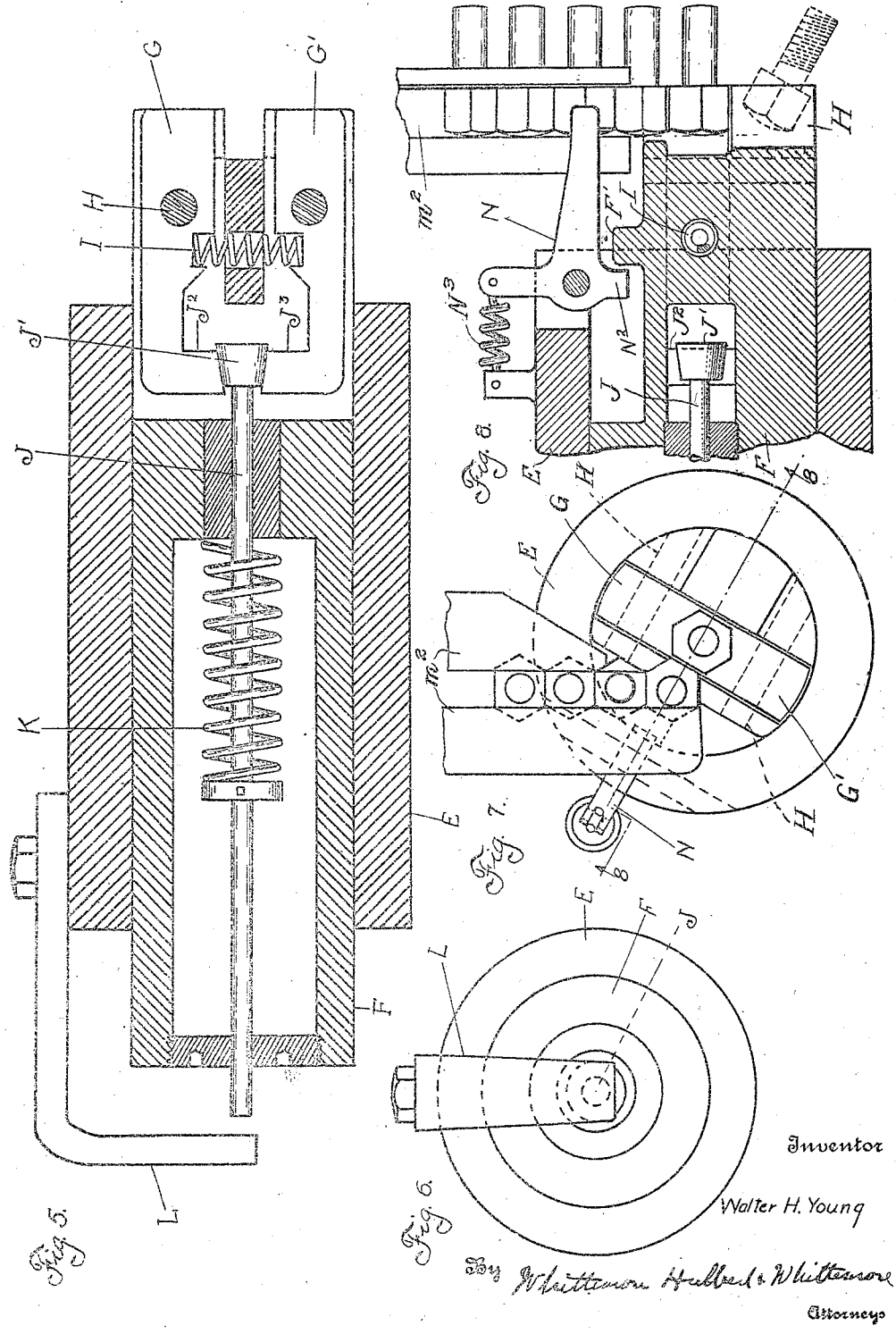

Patented Oct. 30, 1923.

1,472,622

UNITED STATES PATENT OFFICE.

WALTER H. YOUNG, OF DETROIT, MICHIGAN.

SCREW-CUTTING MACHINE.

Application filed April 1, 1920. Serial No. 370,488.

*To all whom it may concern:*

Be it known that I, WALTER H. YOUNG, a citizen of the United States of America, residing at Detroit, in the county of Wayne and State of Michigan, have invented certain new and useful Improvements in Screw-Cutting Machines, of which the following is a specification, reference being had therein to the accompanying drawings.

The invention relates to machines for cutting threads upon bolts and similar articles, and it is the object of the invention to obtain a construction in which the individual articles are automatically fed to and discharged from the threading cutter. It is a further object to obtain a simplified construction of machine which can be manufactured at low cost and will perform its work accurately and efficiently. With these objects in view the invention consists in the construction as hereinafter set forth.

In the drawings:

Figure 1 is a side elevation of the machine;

Figure 2 is a plan view thereof, omitting the chute formed by the parts M′, M and M² and further omitting the finger N;

Figure 3 is a cross-section on line 3—3 of Figure 2;

Figure 4 is a side elevation thereof;

Figure 5 is a sectional plan view showing the work-holding chuck and automatic locking and unlocking mechanism therefor;

Figures 6 and 7 are opposite end elevations thereof;

Figure 8 is a cross-section on line 8—8 of Figure 7.

Figure 9 is a view partly in end elevation and partly in cross section taken on line 9—9 of Figure 1.

A is a suitable bed or frame on which is mounted a head B for the revoluble spindle C, and D is a threading die mounted on said spindle provided with means for closing and releasing the threading cutters thereof. E is a bearing mounted on the frame in axial alignment with the spindle C, and F is a work-holding plunger longitudinally slidable within said bearing. The inner end of said plunger has mounted thereon the work holding jaws G and G′ adapted to engage the polygonal head of a bolt or screw to be threaded and to hold the same from rotation during the threading operation. The jaws G and G′ are preferably pivotally mounted upon the plunger, as indicated at H, and are yieldably and resiliently pressed towards clamping position by a spring I. There is also provided a locking device for holding the jaws rigidly clamped, which as shown in Figure 5 consists in a rod J having a tapering head J′ for engaging correspondingly shaped lugs J² and J³ on the rear ends of the jaws G and G′. The rod J is yieldably actuated longitudinally by a spring K within a recess in the plunger F, while the outer end of the rod projects beyond said plunger and is adapted in one position of movement to contact with a stationary stop L, the arrangement being such that when the plunger F is moved outward contact of the rod J with the stop L will disengage the tapering head J′ from the lugs J² and J³ and will permit the jaws G and G′ to be forced open for receiving the work. When, however, the plunger is moved inward, the release of the rod J from the stop L permits the spring K to force the head J′ between the lugs J² and J³, thereby locking the jaws G and G′ in clamping position.

For feeding the work to the work-holding chuck, I have provided an automatic device comprising a guide-way M mounted above the machine having a slotted substantially horizontal portion M′ into which the blanks may be dropped and a portion M² curving into the vertical plane and provided with guides for engaging the heads of the blanks. The lower end of the portion M² extends adjacent to the work-holding jaws G and G′ when the plunger F is in its outer position and there is provided a transfer device for successively forcing blanks from the member M² into engagement with said jaws. As shown in Figure 8, this transfer device comprises a finger N pivoted at N′ to swing in a plane passing through the axis of the plunger and also through the center of the lowermost blank in the guide member M². This plane is also at right angles to one of the polygonal faces of the head of the blank so that by pressing the finger inward, it will force said lowermost blank out of its holding guide and into engagement with the jaws G and G′ against the yielding pressure of the spring I. The finger N is automatically actuated from the plunger F by a lug F′ thereon, which engages an actuating bell crank arm N² on the finger, during the final retracting stroke of the plunger, thereby rocking the finger and transferring the blank at the time when the jaws G and G' are unlocked by withdrawal of the tapering head J'.

To engage the work with the threading cutters the plunger F must be moved inward with sufficient pressure to cause the cutters to take hold of the work and further forward movement is then controlled by the screw threaded engagement of the work with the cutters while the friction feeding device slips until thread is completed. Such a feeding device I have provided with an exceedingly simple construction, comprising a worm or spiral gear O on the spindle C engaging a cooperating worm gear or spiral gear P sleeved upon a transverse spindle Q in the head B. The outer end of the spindle Q is provided with a crank, cam, or eccentric R which is operatively connected with a rockable lever S pivotally mounted on the head B. The free end of this lever S is connected by a link T with a pin U projecting laterally from the spindle F and movable in a slot E' in the bearing E.

As has been stated, the gear wheel P is sleeved upon the spindle Q, so as to be independently revoluble. There is, however, provided a friction clutch for yieldably coupling the gear wheel with the spindle, which as shown comprises the friction plates V and V' on opposite sides of the gear and connected to the spindle to revolve therewith. The plate V' is longitudinally slidable upon a reduced shank Q' of the spindle Q and is placed under a variable yieldable tension by the spring W upon said shank and the adjusting nut W' engaging a threaded portion of the shank. Thus, any desired degree of friction may be placed upon the disks V and V' so as to rotatively drive the spindle Q by the gear wheel P while permitting a certain degree of slippage.

With the construction as described, in the operation of the machine the blanks are placed in the trough-shaped member M', which permits the round shanks thereof to drop downward while the heads are retained by the guide. The portion M' is sufficiently inclined to permit the gradual feeding downward of the blanks, which automatically arrange themselves in the parallelism and this feeding is continuous, while the blanks are passing around the curved portion M² to the lower end of the guide. Motion being imparted to the spindle C through suitable means, such as the pulley C', this spindle will be revolved and through the spiral or worm gear and cooperating gear P rotary movement is transmitted to the spindle Q. This will cause the crank or eccentric to communicate movement to the rockable arm S and the latter through the rod T and pin U will impart a reciprocating movement to the plunger F. As has been stated, the outward movement of this plunger F causes the unlocking of the jaws G and G' by engagement of the rod J with the stop L and disengagement of the tapering head J' from the lugs J² and J³; also the finger N is simultaneously actuated by the lugs F' and N² and will force one of the blanks into engagement with the jaws. During the opposite or inward movement of the plunger, the finger N is retracted by a spring N³ and the locking head J' is engaged with the lugs J² and J³ so that the head of the blank is rigidly clamped by the jaws. All this occurs before the inner end of the blank comes into engagement with the threading cutters and the speed of movement is such that the blank will be forced into a cutter to initiate the threading operation. It is not essential that the feeding movement of the blank should exactly correspond with the advancement due to the pitch of the thread, for the friction clutch, which couples the gear P with the spindle Q, permits of the necessary slippage. Thus, all that is required is that the feeding movement should properly start the threading operation, which will then be controlled by the threading cutters. At the completion of the threading movement the threading jaws are released by a trip lever X engaging the revoluble cutter and having its free end actuated by collars X' and X² on the rod T. Thus the threading jaws are released at the completion of the threading cut, permitting the blank to be withdrawn in the outward movement of the plunger F and during this movement the collar X² engaging the lever X will again set the threading jaws for another threading operation. The threaded blank is released from the jaws G and G' by being pressed out of engagement therewith upon the forcing into engagement therewith of another blank, this being due to the finger N operating as previously described.

To permit of adjusting the movement of the plunger F to correspond with the length of thread to be cut, the crank R or equivalent device is adjustable in throw. As shown, the crank R is formed by a pin R' having a T-head R² engaging a transverse slot R³ in the head of the spindle Q so as to permit of adjustment to different radial distances from the center of the spindle. The pin R' revolubly engages a block R⁴ which is longitudinally slidable in a slot R⁵ in the lever S, thereby permitting the rotation of the crank in all positions of adjustment and the imparting of a reciprocating movement to the lever corresponding to the throw of the crank.

What I claim as my invention is:

1. The combination with a revoluble spindle having a threading cutter mounted thereon, of a non-revoluble work-holding plunger in axial alignment therewith, means for longitudinally reciprocating said work holding spindle, means actuated by said revolving spindle for operating said reciprocating means, and a friction clutch in said actuating means for permitting movement of the work at a speed corresponding to the pitch of the thread.

2. The combination with a revoluble spindle and a threading cutter mounted thereon, of a work-holding chuck mounted for reciprocation in axial alignment with said spindle, a gear train driven by said spindle, a friction clutch in said train, a variable throw crank actuated by said train, and means actuated by said crank for imparting reciprocating motion to said work holder.

3. The combination with a revoluble spindle, of a threading cutter mounted thereon, a worm gear mounted on said spindle, an intermeshing gear, a spindle extending transversely to said revoluble spindle on which said intermeshing gear is sleeved, and means connected to said transverse spindle for frictionally engaging said gear wheel, a crank actuated by said spindle, and a rod connecting said crank to said work-holding chuck.

4. The combination with a revoluble spindle, of a threading cutter mounted thereon, a hollow bearing in which said spindle is journaled, a gear train within said hollow bearing and driven from said spindle, a transverse spindle, a friction clutch between said gear train and transverse spindle, a crank on said transverse spindle, a rod connected to said crank, and a work holder mounted for reciprocation in axial alignment with said spindle and actuated by said rod.

5. The combination with a revoluble spindle, of a threading cutter mounted thereon, a work-holding plunger in axial alignment with said revolving plunger, a chuck mounted on said work-holding plunger comprising separable jaws yieldably and resiliently pressed for its clamping position, means for reciprocating said work holding plunger towards and from said threading cutter, and means actuated automatically by the reciprocation of said plunger for engaging and disengaging work with said yieldable jaws when the plunger is retracted and for locking said jaws from yielding when the plunger is moved to engage the work with said cutter.

6. The combination with a revoluble spindle and a threading cutter mounted thereon, of a work-holding plunger mounted for reciprocation in axial alignment with said revolving spindle, work-clamping jaws mounted on said plunger, means for feeding work blanks adjacent to said jaws, a transfer device actuated upon the outward movement of said work-holding plunger for forcing a blank from said work feeding means into engagement with said jaws, and means operating upon the advancement of said plunger towards the cutter for locking said jaws.

7. The combination with a revoluble spindle and a threading cutter mounted thereon, of a work holding plunger mounted for reciprocation in axial alignment with said threading cutter, work-clamping jaws mounted on said work-holding plunger, resilient means for pressing said jaws into clamping engagement, means for feeding work blanks adjacent to said jaws in one position of their reciprocation, means actuated by the reciprocating movement of said work-holding plunger for forcing a blank from said work feeding means into engagement with said yieldable jaws, and means for effecting a locking of said jaws as they are advanced to carry the work into engagement with the cutter.

8. The combination with a rotative threading cutter, of a non-revoluble work holding plunger in axial alignment with said cutter, means for actuating longitudinal reciprocation of said plunger, and a friction clutch in said actuating means for permitting movement of the work at a speed corresponding to the pitch of the thread.

9. The combination with a threading cutter, and a work holding plunger in axial alignment therewith, one of said elements being revoluble, means for rotating said revoluble element, means for actuating longitudinal reciprocation of one of said elements, and a friction clutch in said actuating means for permitting movement of the work at a speed corresponding to the pitch of the thread.

10. The combination with a threading cutter and a work holding plunger in axial alignment therewith, one of said elements being revoluble, means for rotating said revoluble element, means for actuating longitudinal reciprocation in axial alignment with said cutter, a variable throw crank, means actuated by said crank for imparting reciprocating motion to the work holder, and actuating means for said crank including a friction clutch for permitting movement of the work at a speed corresponding to the pitch of the thread.

11. The combination with a rotative threading cutter, of a work holding chuck mounted for reciprocation in axial alignment with said cutter, a variable throw crank, means actuated by said crank for imparting reciprocating motion to the work holder, and actuating means for said crank including a friction clutch for permitting movement of the work at a speed corresponding to the pitch of the thread.

12. The combination with a rotative threading cutter, of a work holding plunger in axal alignment with said cutter, a chuck carried by said plunger comprising a pair of jaws yieldably and resiliently pressed to their work engaging position, means for reciprocating said plunger toward and from the threading cutter, and means for automatically engaging the blanks with said jaws, and disengaging the threaded blanks from the jaws.

13. In an automatic thread cutting machine, a reciprocatory work holder comprising a pair of work engaging jaws, means yieldably urging said jaws toward each other to establish an initial engagement of the jaws with the work, and means engageable with said jaws to maintain them unyieldingly engaged with the work during thread cutting.

14. In an automatic thread cutting machine, a pair of intermediately pivoted jaws, fashioned at their forward ends to engage a bolt head, a spring compressed between said jaws rearward of their pivot for yieldably forcing the forward ends of the jaws into initial engagement with the work, and means insertable between the rear ends of the jaws to unyieldingly maintain their engagement with the work.

15. In an automatic thread cutting machine, a reciprocatory work holder comprising a pair of work engaging jaws, and means for yieldably urging said jaws into an initial engagement with the work, of means for rigidly clamping said jaws upon the work controlled by reciprocation of said work holder.

16. In an automatic thread cutting machine, a reciprocatory work holder comprising a pair of work engaging jaws, and a member acting upon said jaws during the major portion of the stroke of the work holder to clamp said jaws rigidly upon the work, and automatic means for disengaging said member from said jaws as the work holder assumes its retracted position.

In testimony whereof I affix my signature.

WALTER H. YOUNG.